US009632166B2

(12) United States Patent
Trail et al.

(10) Patent No.: US 9,632,166 B2
(45) Date of Patent: Apr. 25, 2017

(54) OPTICAL WAVEGUIDE COUDE PATH FOR GIMBALED SYSTEMS HAVING AN OPTICAL COUPLING ELEMENT

(71) Applicant: RAYTHEON COMPANY, Waltham, MA (US)

(72) Inventors: Nicholas D. Trail, Tucson, AZ (US); Jim R. Hicks, Tucson, AZ (US); Daniel W. Brunton, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 47 days.

(21) Appl. No.: 14/857,140

(22) Filed: Sep. 17, 2015

(65) Prior Publication Data
US 2017/0082721 A1    Mar. 23, 2017

(51) Int. Cl.
| | |
|---|---|
| *G01S 3/786* | (2006.01) |
| *F21V 8/00* | (2006.01) |
| *G02B 17/00* | (2006.01) |
| *G01C 3/08* | (2006.01) |

(52) U.S. Cl.
CPC ............. *G01S 3/786* (2013.01); *G01C 3/08* (2013.01); *G02B 6/0005* (2013.01); *G02B 17/008* (2013.01)

(58) Field of Classification Search
CPC ........ F41G 7/2213; F41G 7/26; G01S 7/4818; G01S 17/023; G01S 3/786; G01C 3/08
USPC ............. 250/203.6, 203.1, 216, 239
See application file for complete search history.

(56) References Cited

U.S. PATENT DOCUMENTS

| | | | |
|---|---|---|---|
| 4,024,392 A | 5/1977 | Teppo et al. | |
| 5,317,148 A | 5/1994 | Gray et al. | |
| 6,323,941 B1 | 11/2001 | Evans et al. | |
| 6,864,965 B2 | 3/2005 | DeFlumere | |
| 7,304,296 B2 | 12/2007 | Mills et al. | |

(Continued)

FOREIGN PATENT DOCUMENTS

| | | |
|---|---|---|
| DE | 102007030880 A1 | 1/2009 |
| EP | 1241486 A2 | 9/2002 |

OTHER PUBLICATIONS

International Search Report and Written Opinion for PCT/US2016/041158 dated Oct. 21, 2016.

*Primary Examiner* — Que T Le
(74) *Attorney, Agent, or Firm* — Lando & Anastasi, LLP (57) ABSTRACT

A dual-mode active and passive gimbaled optical system including a mechanism for coupling an optical signal from an off-gimbal active-mode source into the on-gimbal passive-mode optical path. One example of the system includes a passive off-gimbal detector assembly configured to image emissive electromagnetic radiation from a viewed scene, and a receiver-path optical assembly, including on-gimbal objective optics, that directs the electromagnetic radiation to the off-gimbal detector assembly. The system further includes an off-gimbal active source that generates an optical signal, a gimbal bearing assembly that supports rotation of the gimbal and includes a centrally-located output ferrule mated to an optical fiber that transports the optical signal from the active source to the output ferrule, and an on-gimbal optical coupling element that receives the optical signal from the output ferrule and couples the optical signal into the receiver optical path to direct the optical signal toward the on-gimbal objective optics.

14 Claims, 4 Drawing Sheets

(56) References Cited

U.S. PATENT DOCUMENTS

| | | |
|---|---|---|
| 7,667,190 B2 | 2/2010 | Mills et al. |
| 7,742,151 B2 | 6/2010 | Krasutsky |
| 9,335,126 B2 * | 5/2016 | Martin ................. G02B 26/101 |
| 2004/0004707 A1 | 1/2004 | DeFlumere |
| 2006/0170903 A1 | 8/2006 | Aburmad et al. |
| 2009/0250597 A1 | 10/2009 | Mills et al. |
| 2010/0208318 A1 | 8/2010 | Jensen et al. |

* cited by examiner

OPTICAL WAVEGUIDE COUDE PATH FOR GIMBALED SYSTEMS HAVING AN OPTICAL COUPLING ELEMENT

BACKGROUND

It is desirable to increase the capability and performance of electro-optical seekers. In particular, active laser modes allow a unique capability to determine range and range-rate, and/or provide illumination for short-wave infrared (SWIR) operation. However, active mode(s) require more hardware and inherent complexity and/or cost in order to meet performance objectives. As a result, conventionally, active electro-optical modes have been limited to larger airframes and gimbal platforms that provide more freedom and available volume for packaging an active laser system, and where cost is less constrained. This approach has limited ability to reduce cost as it only adds components and processes. In certain conventional, larger LADAR (laser detection and ranging) systems, for example, 12-18 inch diameter gimbals, an active mode can be incorporated using free-space optical paths that are folded into the "blind spots" of the passive receiver (through the use of "holed" mirrors, etc.). However, this approach similarly has limited applicability to large platforms, and is cost prohibitive in certain applications.

SUMMARY OF INVENTION

There is a need for a compact, low-cost, and stable active electro-optical architecture that can incorporate an active electro-optical mode of operation, and associated active laser path(s), into otherwise passive electro-optical systems. Aspects and embodiments provide an approach to achieve these objectives and meet this need. As discussed in more detail below, certain embodiments provide an architecture capable of introducing active electro-optic modes into both small and large optical platforms, such as both small and large seekers, for example. In addition, certain embodiments provide the capability to include one or more infrared modes, for example, an SWIR and/or near-infrared (NIR) mode, to provide illumination capability and allow for night-time operation and/or co-boresighted laser designator and illuminator paths, as discussed further below.

According to one embodiment, a dual-mode gimbaled optical system comprises a dual-axis system gimbal having a roll axis and a nod axis and including a nod gimbal that rotates about the nod axis and a roll gimbal that rotates about the roll axis, and an off-gimbal detector assembly configured to receive electromagnetic radiation, and a receiver-path optical assembly configured to receive the electromagnetic radiation from object space and to direct and focus the electromagnetic radiation along a receiver optical path to the off-gimbal detector assembly, the receiver-path optical assembly including on-gimbal objective optics disposed on the nod gimbal. The system further comprises an optical source configured to generate an optical signal, the optical source being located off the nod gimbal, an optical fiber coupled to the optical source and configured to transport the optical signal, a nod-axis bearing assembly configured to support rotation of the nod gimbal about the nod axis, the nod axis bearing assembly including a centrally-located output ferrule mated to the optical fiber and configured to receive the optical signal from the optical fiber and to output the optical signal as an optical beam, and an optical coupling element configured to receive the optical beam from the output ferrule and to couple the optical beam into the receiver optical path and to direct the optical beam toward the on-gimbal objective optics.

In one example the optical coupling element is disposed approximately centered on the nod axis. In one example the optical coupling element is a fold mirror. The fold mirror can have a reflecting surface configured to reflect the optical beam toward the on-gimbal objective optics and an opposing back surface, and the system can further include a sensor disposed on the back surface of the fold mirror and configured to receive reflections of the optical beam via the on-gimbal objective optics. In another example the optical coupling element is a beamsplitter.

In one example the receiver-path optical assembly further includes a first plurality of optical elements disposed on the dual-axis gimbal and a second plurality of off-gimbal optical elements configured to receive the electromagnetic radiation from the first plurality of optical elements and to focus the electromagnetic radiation to the detector assembly.

In one example the optical source is a laser source. In another example the electromagnetic radiation is infrared radiation and the optical beam is a visible laser beam. The optical source can be located on the roll gimbal.

In another example the nod-axis bearing assembly further includes a collimating lens assembly mated to the output ferrule and configured to collimate the optical beam.

According to another embodiment, a dual-mode gimbaled optical system comprises a nod gimbal configured to rotate about a nod axis, a passive-mode off-gimbal detector assembly configured to receive emissive electromagnetic radiation from a viewed scene and to produce therefrom an image of the scene, and a receiver-path optical assembly configured to receive the electromagnetic radiation from the viewed scene and to direct and focus the electromagnetic radiation along a receiver optical path to the off-gimbal detector assembly, the receiver-path optical assembly including on-gimbal objective optics disposed on the nod gimbal. The system further comprises an active-mode off-gimbal laser source configured to generate an optical signal, an optical fiber coupled to the laser source and configured to transport the optical signal, a nod-axis bearing assembly configured to support rotation of the nod gimbal about the nod axis, the nod axis bearing assembly including a centrally-located output ferrule mated to the optical fiber and configured to receive the optical signal from the optical fiber and to output the optical signal as an optical beam, and an on-gimbal optical coupling element configured to receive the optical beam from the output ferrule and to couple the optical beam into the receiver optical path and to direct the optical beam toward the on-gimbal objective optics.

In one example the system further comprises a roll gimbal configured to rotate about a roll axis perpendicular to the nod axis, the laser source being disposed on the roll gimbal.

In one example the coupling element is a fold mirror that is disposed on and axisymmetric about the nod axis. In another example the coupling element is a beamsplitter.

In one example the nod-axis bearing assembly further includes a collimating lens assembly mated to the output ferrule and configured to collimate the optical beam.

Another embodiment is directed to a dual-mode active and passive gimbaled optical system including a mechanism for coupling an optical signal from an off-gimbal active-mode source into the on-gimbal passive-mode optical path. One example of the system includes a passive off-gimbal detector assembly configured to image emissive electromagnetic radiation from a viewed scene, and a receiver-path optical assembly configured to direct the electromagnetic radiation to the off-gimbal detector assembly, the receiver-path optical assembly including on-gimbal objective optics. The system further includes an off-gimbal active source that generates an optical signal, a gimbal bearing assembly that supports rotation of the gimbal and includes a centrally-located output ferrule mated to an optical fiber that transports the optical signal from the active source to the output ferrule. The system further includes an on-gimbal optical coupling element that receives the optical signal from the output ferrule and couples the optical signal into the receiver optical path to direct the optical signal toward the on-gimbal objective optics.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments provide for a power efficient, reliable, compact, lightweight, and inexpensive solution for optically coupling an off-gimbal active optical source (such as a laser, for example) into the optical path of an on-gimbal optical element, such as a telescope, for example. Although the technique is described below with reference primarily to a dual-axis roll and nod gimbal, the technique may be adapted for gimbal motion in any one or more of the three common axes of rotation, namely, roll, nod, and elevation.

Conventional electro-optical (EO) seekers are nearly all passive in nature (that is they operate by sensing energy from the scene directly). Operating passively, electro-optical seekers do not obtain a direct measurement for range, which can impair operational modes in certain applications. In addition, conventional passive electro-optical seekers must operate in the emissive mid-wave or long-wave infrared (MWIR or LWIR) spectral bands to preserve diurnal operational. By adding an active (e.g., laser) mode to the seeker, the platform can acquire range to assist operation (adjunct mode) or operate at shorter (e.g., SWIR) wavelengths and use an illuminator for night-time operation, thereby achieving enhanced performance. A variety of other electro-optical systems, in addition to seekers, may also benefit from the ability to include an active mode.

Aspects and embodiments are directed to methods and architectures that provide the capability to fold an active path into the passive receiver with a small footprint that can support seekers or other electro-optical systems down to approximately one (1) inch diameter, that are inherently stable across all environments (e.g., can maintain relative boresight passively), and are cost-effective by minimizing part count and allowing modular upgrade and revision paths. In particular, as discussed in more detail below, aspects and embodiments provide a solution to incorporate an active laser source across a gimbal system, for example, a roll/nod orientation gimbal. The laser source can be remotely packaged from the gimbal by inclusion of a routing optical fiber, as described further below. The laser sources can be injected into the optical waveguide of the optical fiber, which in turn can routed into a roll skirt for the roll gimbal allowing free motion in that direction. According to certain embodiments, the optical fiber is fitted with a ferrule that acts as the central bearing of the nod axis. This replaces the normal solid bearing mount with a ferrule and optical fiber to directly couple the output of the optical fiber into the nod axis, independent of nod orientation. A beam-splitter or split fold-mirror can be used to couple the output of the optical fiber into the optical receiver path, and allow operation over the full gimbal range. Placing the optical fiber (in its ferrule) at the center of nod rotation allows stable operation across the full gimbal space and environmental operation. The output of the optical fiber can also be equipped with a collimating lens to control output divergence into any desired shape (e.g., central spot, line or volume illumination), as discussed further below. This approach also allows for various receiver options, including, for example, utilizing the passive receiver for the active path, or adding a small detector onto the back of the beam-splitter or fold-mirror for direct detection in the active mode.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1A:
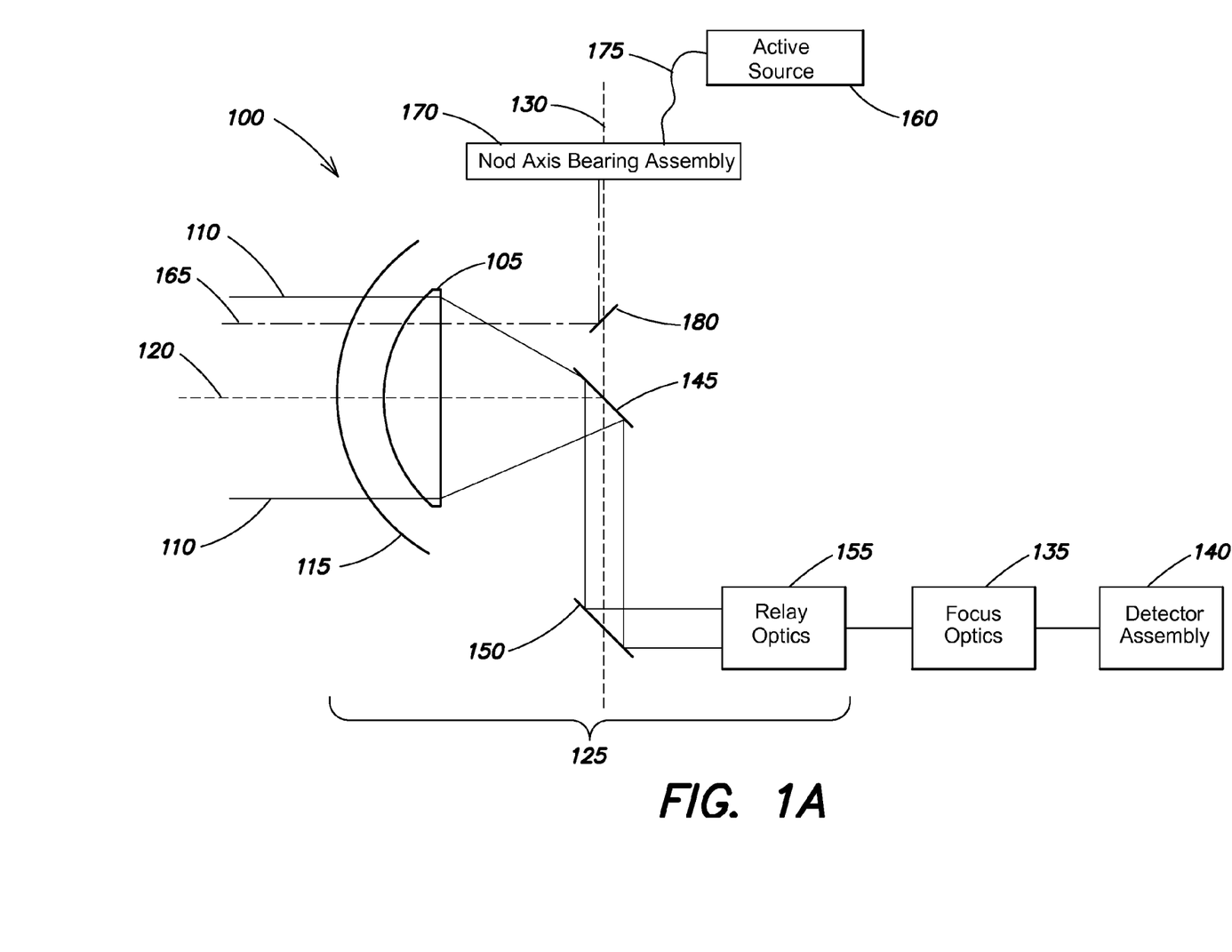
FIG. 1A is a block diagram of one example of a dual-mode gimbaled optical system incorporating an active mode folded into the passive optical path, in accord with aspects of the present invention.

Referring to FIG. 1A, there is illustrated a block diagram of one example of a gimbaled optical system 100 incorporating an active laser path. The system may thus accommodate both an active function (e.g., laser designation, range-finding, etc.) using an active laser beam and a passive function (e.g., imaging) based on received electromagnetic radiation.

For the passive function, the system includes objective optics 105 that receives electromagnetic radiation 110 via a front dome or window 115 that is essentially transparent to the electromagnetic radiation at least within a spectral band of interest. The electromagnetic radiation 110 is received along a primary optical axis 120. In FIG. 1A, the objective optics 105 is represented as a single lens; however, as will be readily appreciated by those skilled in the art, the objective optics 105 can include one or more lenses or mirrors. The objective optics 105 is mounted on an inner or nod gimbal of a system gimbal 125, the nod gimbal configured to rotates about a gimbal nod axis 130. The received electromagnetic radiation 110 is directed from the objective optics 105 to focus optics 135, also sometimes referred to as an imager or imaging optics, that focus the electromagnetic radiation to a detector assembly 140. The detector assembly 140 includes one or more imaging sensors, such as a focal plane array, for example, configured to produce an image from the received electromagnetic radiation 110. In certain implementations, the focus optics 135 and detector assembly 140 are located off-gimbal. Accordingly, the system includes a mechanism for transferring the received electromagnetic radiation off the rotating gimbal 125. In the example illustrated in FIG. 1A, this mechanism includes a first fold mirror 145 positioned on the nod axis 130 and configured to reflect the electromagnetic radiation 110 received along the primary optical axis 120 to along a path aligned with the nod axis, as shown. In other implementations, a prism can be used instead of the first fold mirror 145. A second fold mirror 150 reflects the electromagnetic radiation off the nod axis toward the focus optics 135. In certain examples, and additional two fold mirrors 145a and 150a redirect the electromagnetic radiation to allow the focus optics 135 and further components to be centered with respect to the primary optical axis 120 and the front dome or window 115, as shown, for example, in FIG. 1B. This arrangement may be beneficial in implementations where the dome 115 has optical power (curvature) because all rotations are then about the center of the dome and the dome power is unchanged optically with viewing angles about the roll and/or nod axes.

Optionally, relay optics 155 can be included to transfer the electromagnetic radiation from the second (or fourth) fold mirror to the focus optics 135. The relay optics 155 may be located on or off the gimbal 125. In some examples the relay optics are located on an outer or roll gimbal of the system gimbal 125. The relay optics 155 and focus optics 135 can each include one or more lenses or mirrors, along with any other optical elements, such as filters, polarizers, correctors, etc., as may be used to condition the received electromagnetic radiation 110 for enhanced performance imaging at the detector assembly 140.

Figure 1B:
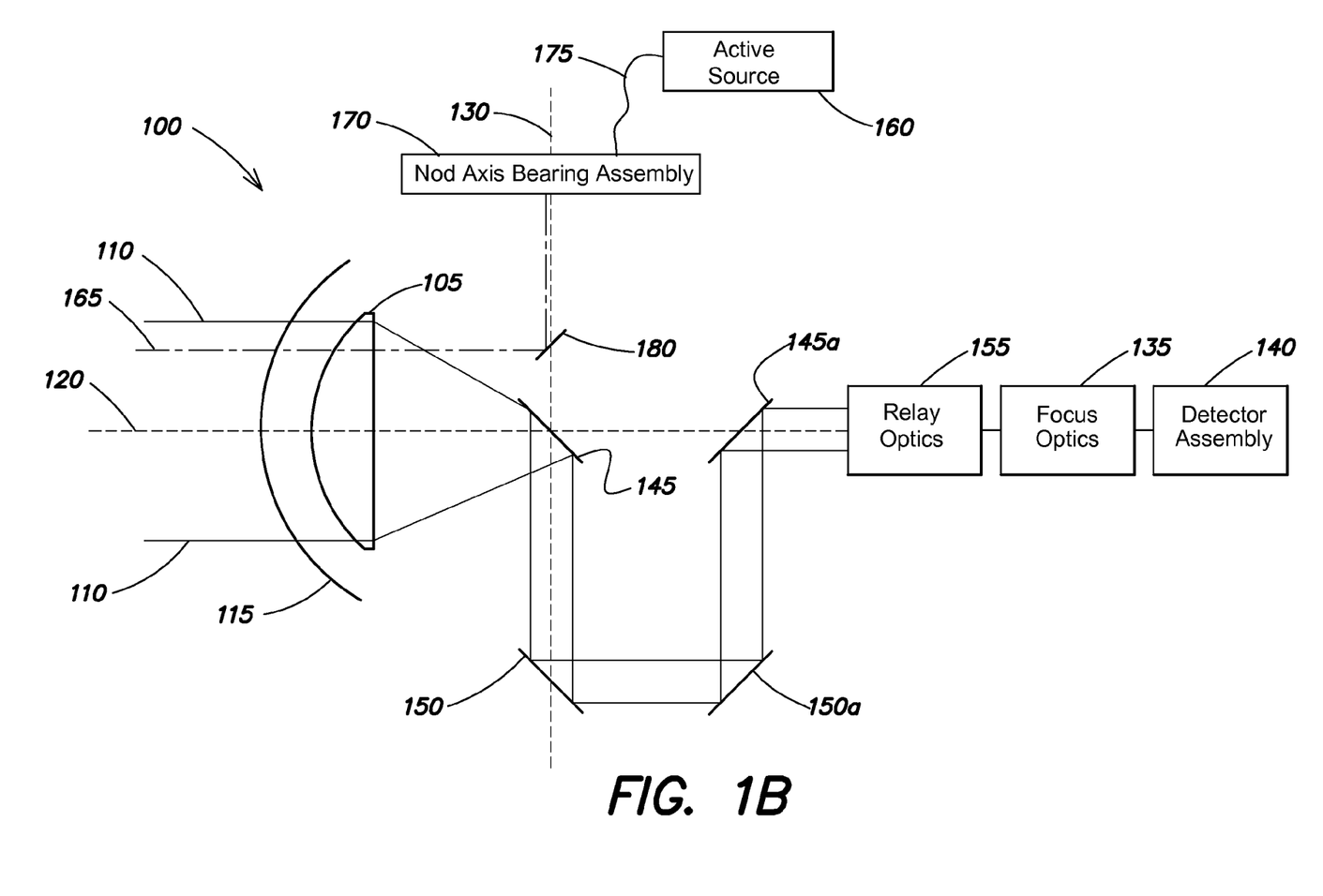
FIG. 1B is a block diagram showing a variation of the example of FIG. 1A in accord with aspects of the present invention.

For the active function, the system 100 further includes an active optical source 160 that generates an optical beam 165. In certain examples the active optical source 160 is located off-gimbal; however, in other examples in which the active optical source 160 is sufficiently small, it can be located on the roll gimbal. The active optical source 160 can include one or more laser diodes, microchips, fiber lasers, or other active emitters. The active optical source 160 is coupled to a nod axis bearing assembly 170 via an optical fiber 175 that carries the optical signal to be transmitted as the optical beam 165. As discussed in more detail below, the nod axis bearing assembly 170 provides a mechanism by which to transport the optical beam 165 onto the nod gimbal, without any change of environment, through the optical fiber 175. A coupling element 180 then combines the optical beam 165 received via the nod axis bearing assembly 170 into the passive/receiver path such that the optical beam 165 is transmitted through the objective optics 105 and window 115, as shown in FIGS. 1A and 1B.

In one example the coupling element 180 is a third fold mirror. The fold mirror can be positioned approximately centered on (i.e., is axisymmetric about) the nod axis. In another example, the coupling element 180 is a beamsplitter. In certain examples the objective optics 105 includes one or more lenses that are transmissive to both the electromagnetic radiation 110 of the passive/receiver function and the optical beam 165. In other examples, the objective optics 105 includes a small hole or aperture though which the optical beam 165 can pass without significantly impacting the receiver function. In certain examples the received electromagnetic radiation 110 for the passive/imaging function includes visible or infrared radiation, and the optical beam includes a laser beam, for example, having a wavelength of approximately 1.064 μm or 1.55 μm; however, in other examples other wavelengths and spectral bands can be used for either or both the active and passive functions. The optical fiber can include a silica fiber for applications in which the optical beam 165 has a wavelength or waveband in a range of about 0.4 μm to 2.3 μm, or can include a fluoride/arsenic for longer wavelengths of the optical beam 165. The optical energy produced by the active optical source 160 is injected into the optical waveguide of the optical fiber 175, which can be routed into a roll skirt for the roll gimbal, allowing free motion in that direction. The optical fiber 175 is coupled into the nod axis bearing assembly, as discussed further below, to bring the optical beam 165 onto the nod axis of the gimbal 125, from where it is coupled into the receiver path along the primary optical axis 120 and transmitted into free space.

Figure 2:
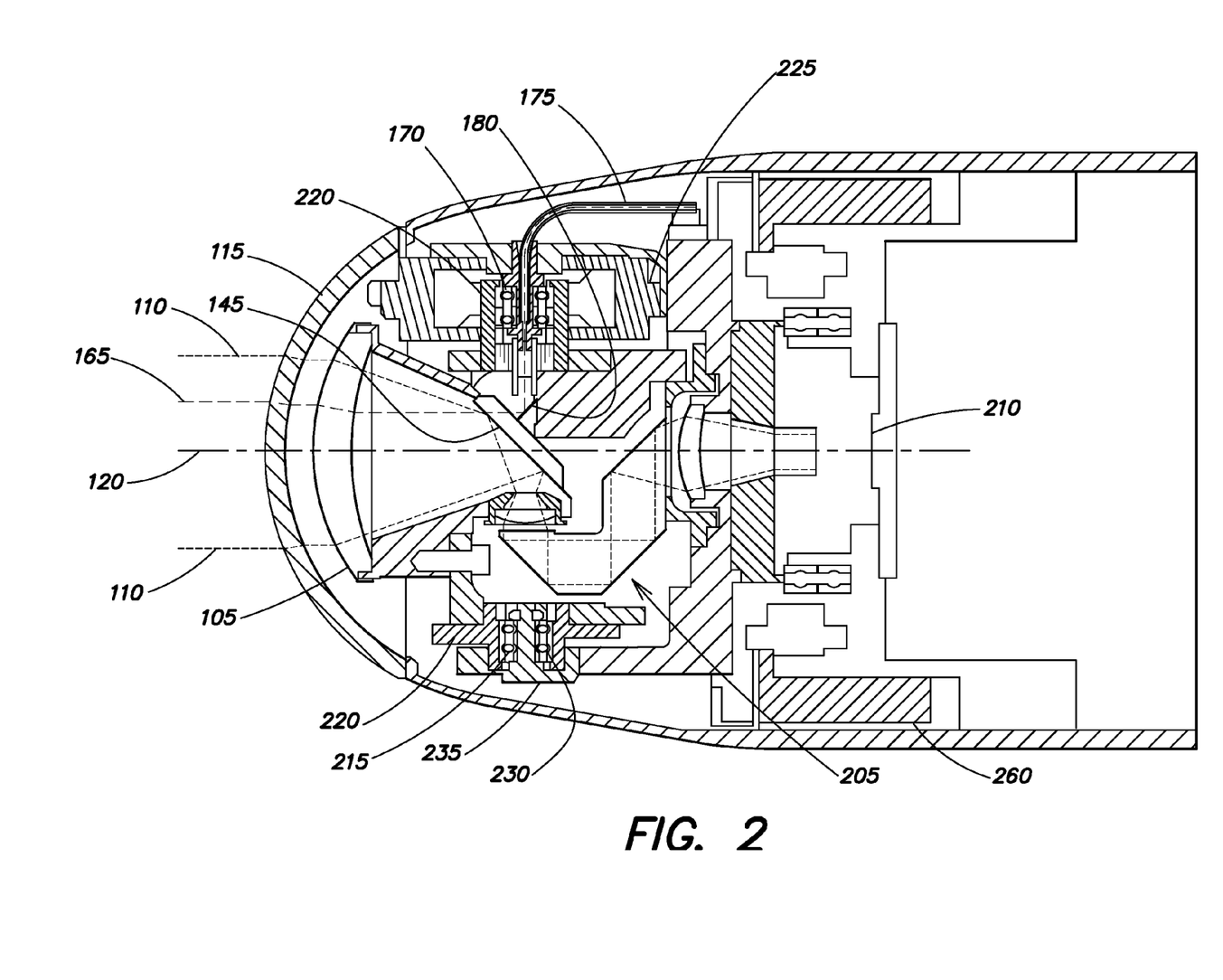
FIG. 2 is diagram of a portion of one example of a dual-mode gimbaled optical system according to aspects of the present invention.

Referring to FIG. 2 there is illustrated a diagram of one example of an implementation of the system of FIG. 1. In this embodiment, the system employs a roll-nod gimbal that supports the objective optics 105 that receives the electromagnetic radiation 110, as discussed above. The objective optics 105 can be centrally located on the inner/nod gimbal 220, as shown in FIG. 2, along the primary optical axis 120. The roll-nod gimbal slews around its axes to point the optical axis 120 toward a target. The received electromagnetic radiation 110 is directed from the first fold mirror 145 along a coude optical path 205 that is formed by a collection of optical elements and which transitions the electromagnetic radiation off-gimbal, where it is focused toward a receiver position 210 at which the detector assembly 140 (not shown in FIG. 2) can be located. As discussed above, in certain implementations, the fold mirror 145 can be replaced with one or more prisms (not shown in FIG. 2). For rotation about the nod axis, the inner gimbal 220 is supported by opposing rotatable nod axis bearing assemblies 170 and 215. A nod axis motor 225 can be mounted on the roll/outer gimbal and drives rotation of the nod gimbal 220.

In a conventional two-axis gimbaled passive optical system, the nod axis bearing assemblies include a standard machined metal bearing 230 and bearing guide 235. However, according to certain embodiments, to enable transport of the optical beam 165 onto the nod axis, one of the conventional nod axis bearing assemblies is replaced with a particularly altered nod axis bearing assembly 170 that is configured to mate with the optical fiber 175 and transmit the optical beam 165 to the coupling element 180.

Figure 3:
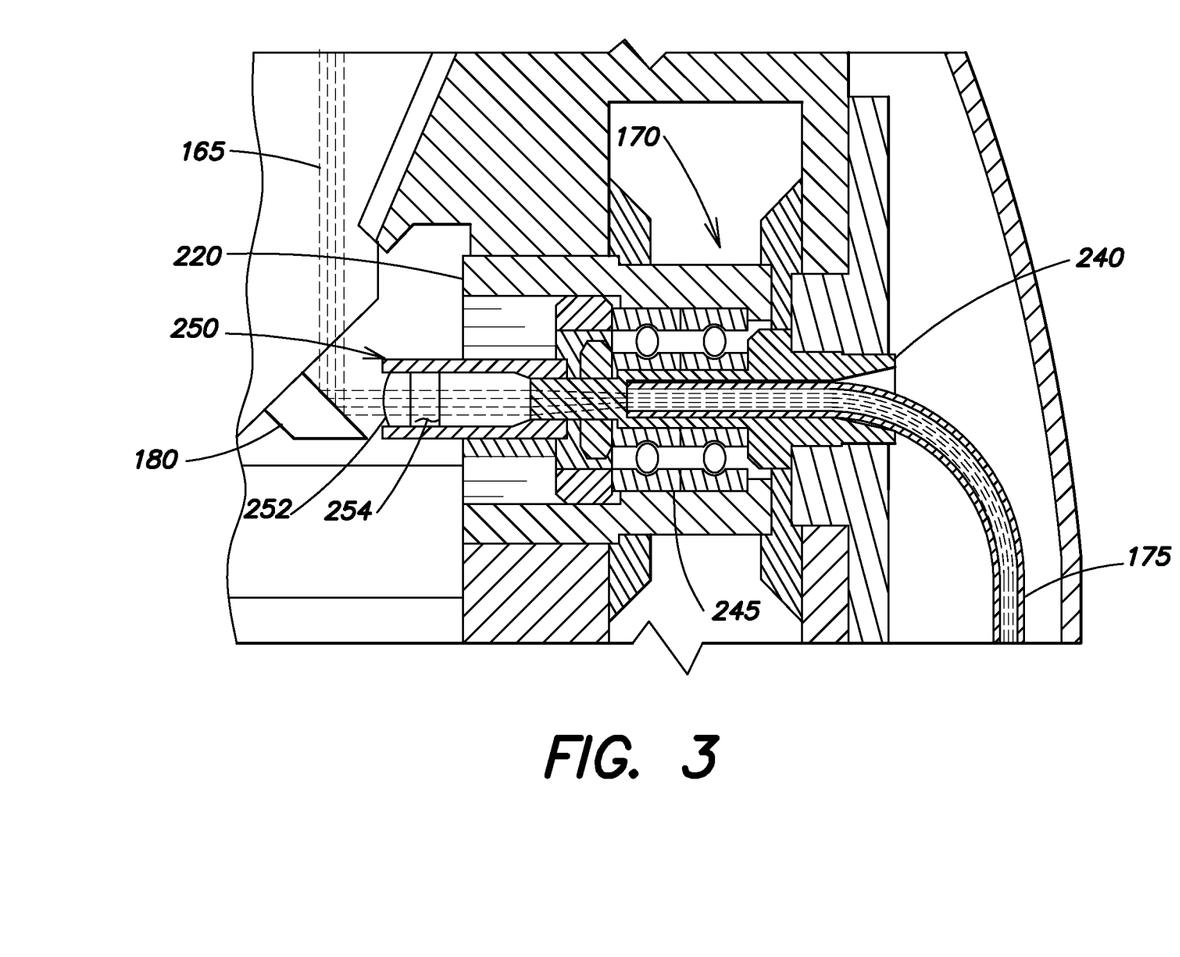
FIG. 3 is an enlarged view of a portion of the system illustrated in FIG. 2.

FIG. 3 is an enlarged view of a portion of the system of FIG. 2, showing an example of the nod axis bearing assembly 170 in more detail. In the illustrated example, the nod axis bearing assembly 170 includes a ferrule 240 that is configured to receive the optical fiber 175, and which acts as a bearing mounting of the nod axis. The ferrule 240 can be metal or ceramic, depending on the application and optionally on cost factors. The ferrule 240 replaces the conventional solid bearing mount 230 and directly couples the output of the optical fiber 175 into the nod axis 130, independent of nod orientation. From here, the coupling element 180 (e.g., a beam-splitter, or fold mirror) couples the output of the optical fiber 175 (namely, the optical beam 165) into the receiver path, as shown in FIG. 2 and discussed above with reference to FIG. 1, thereby allowing operation over the full gimbal range. The ferrule 240 can be fixedly mated to the optical fiber 175. A bearing interface 245 is configured to interface with the outer diameter of the ferrule 240, such that the ferrule fits snugly within the area normally occupied by the conventional solid bearing mount, and can provide the necessary rotational support for the nod gimbal 220. This approach leverages standard tolerances of an optical fiber ferrule, usually <1 μm, for enhanced system operation with minimized cost/volume impact. Placing the optical fiber 175 (in its hard-mated ferrule 240) at the center of nod rotation allows stable operation across the full gimbal space and environmental operation.

According to certain embodiments, the output of the optical fiber 175 can also be equipped with or coupled to a collimating lens assembly 250 to control output divergence of the optical beam 165 into any desired shape (e.g., central spot, line or volume illumination). In the example illustrated in FIG. 3, the collimating lens assembly 250 includes a pair of lenses 252 and 254; however, as will be readily appreciated by those skilled in the art, one or more collimating lenses can used.

Thus, by incorporating the optical fiber 175 and ferrule 240 into the central nod axis assembly, the optical beam 165 can cross the nod gimbal limit (transfer onto and off of the rotating nod gimbal), without requiring complex wiring harnesses or other bulky structure. The optical beam 165 is easily combined into the existing receiver optical path, as shown in FIGS. 1 and 2, using a relatively small coupling element 180, such as a fold mirror or beamsplitter, as discussed above. This approach also allows for various active receiver configurations to receive reflections of the optical beam 165 from a target. For example, the detector assembly can be configured to receive the reflections of the optical beam 165 in addition to the electromagnetic radiation. In another example, a relatively small detector, for example, a quad or single pixel detector, can be included on the back side of the coupling element 180 for direct detection of the reflections of the optical beam 165.

Referring again to FIG. 2, the optical fiber 175 can be incorporated into an optical fiber assembly 260 for storage and dispensing to allow crossing of the roll axis of the gimbal 125. The optical fiber assembly 260 includes a roll skirt control mechanism (not shown) that routes the optical fiber 175 across outer or roll gimbal to the nod axis bearing assembly, and pins the optical fiber 175 along its length at points both on-gimbal and off-gimbal, and where the optical fiber crosses the gimbal axes, so that the optical fiber can move freely with rotation of the roll and nod gimbals. The control mechanism further routes the optical fiber 175 so as to control a radius of curvature of the optical fiber to minimize stress on the fiber, to accommodate a desired range of motion about the roll axis, to avoid entanglement and rubbing of the fiber, to wrap the fiber compactly around the roll axis, and to avoid loading on the gimbal motors. An example of an optical fiber assembly 260 that can be used in the systems of FIGS. 1 and 2 is disclosed in commonly-owned U.S. Pat. No. 7,667,190, which is herein incorporated by reference in its entirety for all purposes. Thus, using a combination of the optical fiber assembly 260 and the ferrule 240 within the nod axis bearing assembly 170, there is achieved a power efficient, compact, reliable, lightweight, and inexpensive solution for optically coupling an off-gimbal active optical source (e.g., a laser source) to an on-gimbal optical component, for example, the objective optics 105.

Thus, aspects and embodiments provide a mechanism and method by which to fold an off-gimbal optical source 160 into a gimbal 125, including roll/nod gimbal orientation, particularly for small volume and cost applications. According to certain embodiments, an optical fiber 175 is used to transfer the optical signal from the off-gimbal source 160 across the gimbal, and a coupling element (e.g., a fold mirror or beamsplitter) 180 is used to couple the optical signal to on-gimbal optics, such as the objective optics 105. The optical fiber 175 can be managed with a roll skirt through the gimbal to accommodate rotation about the roll axis, while the output ferrule 240 operates as a bearing mount for the nod axis. The optical fiber output ferrule 240 provides for a common bearing interface for the nod axis in the gimbal architecture, allows passive bore-sighting, and operates over the full nod range without any other limitations (e.g., it provides a single interface for the gimbal axis, bearing, and collimation optics). The optical path and packaging of the optical signal from the off-gimbal source 160 are thus inherently stable across environments, removing requirements for tight gimbal tolerance coupling and associated costs. Furthermore, this approach allows operation across the electromagnetic spectrum (including at least visible through long-wave infrared) to support multi-band system operation, and in-band (passive sensor) illumination.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A dual-mode gimbaled optical system comprising:
   a dual-axis system gimbal having a roll axis and a nod axis and including a nod gimbal that rotates about the nod axis and a roll gimbal that rotates about the roll axis;
   an off-gimbal detector assembly configured to receive electromagnetic radiation;
   a receiver-path optical assembly configured to receive the electromagnetic radiation from object space and to direct and focus the electromagnetic radiation along a receiver optical path to the off-gimbal detector assembly, the receiver-path optical assembly including on-gimbal objective optics disposed on the nod gimbal;
   an optical source configured to generate an optical signal, the optical source being located off the nod gimbal;

an optical fiber coupled to the optical source and configured to transport the optical signal;

a nod-axis bearing assembly configured to support rotation of the nod gimbal about the nod axis, the nod axis bearing assembly including a centrally-located output ferrule mated to the optical fiber and configured to receive the optical signal from the optical fiber and to output the optical signal as an optical beam; and an optical coupling element configured to receive the optical beam from the output ferrule and to couple the optical beam into the receiver optical path and to direct the optical beam toward the on-gimbal objective optics.

2. The dual-mode gimbaled optical system of claim 1 wherein the optical coupling element is disposed approximately centered on the nod axis.

3. The dual-mode gimbaled optical system of claim 2 wherein the optical coupling element is a fold mirror.

4. The dual-mode gimbaled optical system of claim 3 wherein the fold mirror has a reflecting surface configured to reflect the optical beam toward the on-gimbal objective optics and an opposing back surface, the system further comprising a sensor disposed on the back surface of the fold mirror and configured to receive reflections of the optical beam via the on-gimbal objective optics.

5. The dual-mode gimbaled optical system of claim 1 wherein the optical coupling element is a beamsplitter.

6. The dual-mode gimbaled optical system of claim 1 wherein the receiver-path optical assembly further includes a first plurality of optical elements disposed on the dual-axis gimbal and a second plurality of off-gimbal optical elements configured to receive the electromagnetic radiation from the first plurality of optical elements and to focus the electromagnetic radiation to the detector assembly.

7. The dual-mode gimbaled optical system of claim 1 wherein the optical source is a laser source.

8. The dual-mode gimbaled optical system of claim 7 wherein the electromagnetic radiation is infrared radiation and the optical beam is a visible laser beam.

9. The dual-mode gimbaled optical system of claim 1 wherein the nod-axis bearing assembly further includes a collimating lens assembly mated to the output ferrule and configured to collimate the optical beam.

10. The dual-mode gimbaled optical system of claim 1 wherein the optical source is located on the roll gimbal.

11. A dual-mode gimbaled optical system comprising:
a nod gimbal configured to rotate about a nod axis;
a passive-mode off-gimbal detector assembly configured to receive emissive electromagnetic radiation from a viewed scene and to produce therefrom an image of the scene;
a receiver-path optical assembly configured to receive the electromagnetic radiation from the viewed scene and to direct and focus the electromagnetic radiation along a receiver optical path to the off-gimbal detector assembly, the receiver-path optical assembly including on-gimbal objective optics disposed on the nod gimbal;
an active-mode off-gimbal laser source configured to generate an optical signal;
an optical fiber coupled to the laser source and configured to transport the optical signal;
a nod-axis bearing assembly configured to support rotation of the nod gimbal about the nod axis, the nod axis bearing assembly including a centrally-located output ferrule mated to the optical fiber and configured to receive the optical signal from the optical fiber and to output the optical signal as an optical beam; and
an on-gimbal optical coupling element configured to receive the optical beam from the output ferrule and to couple the optical beam into the receiver optical path and to direct the optical beam toward the on-gimbal objective optics.

12. The dual-mode gimbaled optical system of claim 11 further comprising a roll gimbal configured to rotate about a roll axis perpendicular to the nod axis, the laser source being disposed on the roll gimbal.

13. The dual-mode gimbaled optical system of claim 11 wherein the coupling element is a fold mirror that is disposed on and axisymmetric about the nod axis.

14. The dual-mode gimbaled optical system of claim 11 wherein the nod-axis bearing assembly further includes a collimating lens assembly mated to the output ferrule and configured to collimate the optical beam.

* * * * *